(12) United States Patent
Kirkman

(10) Patent No.: US 7,886,807 B2
(45) Date of Patent: Feb. 15, 2011

(54) DIE CASTING CONTROL METHOD

(75) Inventor: J. Scott Kirkman, Ada, MI (US)

(73) Assignee: Die Therm Engineering L.L.C., Ada, MI (US)

( * ) Notice: Subject to any disclaimer, the term of this patent is extended or adjusted under 35 U.S.C. 154(b) by 556 days.

(21) Appl. No.: 11/869,992

(22) Filed: Oct. 10, 2007

(65) Prior Publication Data

US 2008/0308252 A1 Dec. 18, 2008

Related U.S. Application Data

(60) Provisional application No. 60/944,307, filed on Jun. 15, 2007, provisional application No. 60/952,994, filed on Jul. 31, 2007.

(51) Int. Cl.
*B22D 17/32* (2006.01)
*B22D 46/00* (2006.01)

(52) U.S. Cl. .................. 164/458; 164/113; 164/154.6

(58) Field of Classification Search ............... 164/458, 164/113, 128, 151.4, 154.6, 312, 348
See application file for complete search history.

(56) References Cited

U.S. PATENT DOCUMENTS

| | | | |
|---|---|---|---|
| 4,031,950 A | 6/1977 | Shultz | |
| 4,502,313 A * | 3/1985 | Phalin et al. | ............... 72/342.3 |
| 4,976,305 A | 12/1990 | Tanaka et al. | |
| 5,589,114 A | 12/1996 | Evans | |
| 5,881,796 A | 3/1999 | Brown et al. | |
| 5,887,640 A | 3/1999 | Brown et al. | |
| 5,927,378 A | 7/1999 | Grove et al. | |
| 6,224,816 B1 | 5/2001 | Hull et al. | |
| 6,308,768 B1 | 10/2001 | Rice et al. | |
| 6,312,628 B1 | 11/2001 | Wieder et al. | |
| 6,354,361 B1 | 3/2002 | Sachs et al. | |
| 6,557,617 B1 | 5/2003 | Bagnoud et al. | |
| 6,598,659 B1 | 7/2003 | Frulla | |
| 6,698,496 B2 | 3/2004 | Takayama et al. | |
| 2002/0069997 A1 | 6/2002 | Mendez et al. | |
| 2003/0205352 A1 * | 11/2003 | Blejde et al. | ............. 164/151.4 |
| 2006/0042771 A1 | 3/2006 | Ward | |
| 2006/0082009 A1 | 4/2006 | Quail et al. | |
| 2006/0196957 A1 | 9/2006 | Johnson | |

FOREIGN PATENT DOCUMENTS

| | | |
|---|---|---|
| EP | 0691166 A1 | 1/1996 |
| JP | 59141347 A | 8/1984 |
| JP | 01313146 A | 12/1989 |
| WO | 9706907 | 2/1997 |

OTHER PUBLICATIONS

Scott Kirkman, Die Casting Dies: Thermal Design & Control, book, 2005, pp. 1-54, vol. 3 of 6, North American Die Casting Association, Wheeling, Illinois.
J. Scott Kirkman, Designing Die Casting Dies Series—E-506, Book 1—2005, North American Die Casting Association, Wheeling, Illinois.

* cited by examiner

*Primary Examiner*—Kuang Lin
(74) *Attorney, Agent, or Firm*—McGarry Bair PC

(57) ABSTRACT

A method for monitoring and/or controlling a die casting operation using the rate of coolant flow through cooling lines of a die and the amount of heat being removed from the die by the cooling lines.

14 Claims, 11 Drawing Sheets

Startup Chart

| Stage | Coolant Flow Rate | Amount of Heat Removed | Temperature Change Threshold |
|---|---|---|---|
| 1 | $F_I$ | H for $F_I$ | $\Delta T_T$ for $F_I$ |
| 2 | $F_I + \Delta F$ | H for $F_I + \Delta F$ | $\Delta T_T$ for $F_I + \Delta F$ |
| 3 | $F_I + \Delta F + \Delta F$ | H for $F_I + \Delta F + \Delta F$ | $\Delta T_T$ for $F_I + \Delta F + \Delta F$ |
| ⋮ | ⋮ | ⋮ | ⋮ |
| n | $F_O$ | H for $F_O$ | $\Delta T_T$ for $F_O$ |

Fig. 4

DIE CASTING CONTROL METHOD

CROSS-REFERENCE TO RELATED APPLICATION

This application claims the benefit of U.S. Provisional Application Nos. 60/944,307, filed Jun. 15, 2007, and 60/952,994, filed Jul. 31, 2007, both of which are incorporated herein by reference in their entirety.

BACKGROUND OF THE INVENTION

1. Field of the Invention

The present invention relates generally to die casting. More specifically, the invention relates to monitoring and controlling a die casting operation.

2. Description of the Related Art

Die casting is the injection of molten metal under high pressure into a steel mold, interchangeably referred to as a die, for the purposes of rapid manufacturing at rapid production rates. The molten metal is most often a non-ferrous alloy, which are used because the best performance for die-cast products is gained through a blend of materials. Some typical alloys that are used for die casting are aluminum alloys, magnesium alloys and zinc alloys, which contain other elements such as silicone.

Two methods can be used to inject molten metal into a die; cold chamber and hot chamber. A schematic illustration of a typical cold chamber die casting machine 500 is shown in FIG. 1A. The die casting machine 500 comprises a mold 502 made of tool steel in at least two die halves 504, 506 that together define a part cavity 508. The cover half 504 is held by a fixed machine platen 505, and the ejector half 506 is held by a moving machine platen 507 so that the ejector half 506 can move back and forth to open and close the mold 502. Molds 502 often also have moveable slides, cores, or other sections to produce holes, threads, and other desired shapes in the casting. Molds 502 are alternately referred to as dies or tools.

The die casting machine 500 further includes a pressure chamber 510 through which molten metal from a supply 512 is delivered or injected into the mold 502 using a plunger 514. One or more shot sleeves 516 in the cover half 504 allow molten metal to enter the die and fill the part cavity 508. When the pressure chamber 510 is filled with molten metal, the plunger 514 starts traveling forward and builds up pressure, thereby forcing the metal to flow though the shot sleeve 516 to the part cavity 508. After the metal has solidified, the plunger 514 returns to its initial position, and the ejector half 506 of the die opens for the part or casting to be removed from the mold 502. Ejector pins 517 are used to push the casting out of the ejector half 506 of the mold 502. This process is referred to as a single casting cycle. Multiple casting cycles can be completed during a die casting operation.

A schematic illustration of a typical cold chamber die casting mold 502 is shown in FIG. 1B. The die casting mold 502 comprises a biscuit 518, which is the remaining material in the shot sleeve 516 after the shot is complete. One or more runners 520 connect the shot sleeve 516 to corresponding gates 522 through which molten metal enters the part cavity 508. One or more overflows 524 are connected to the part cavity 508 to receive the first molten metal that enters the part cavity 508 because it is usually contaminated with petroliates from the die spray applied to the mold 502 in previous casting operations.

Cooling lines 526 run throughout the mold 502, through which coolant, such as water or oil flows to aid in the removal of heat from the mold 502. There are a number of individual cooling lines 526 that are responsible for cooling different parts of the casting or shot. The number of cooling lines 526 in a mold varies according to the size of the mold. For example, a small mold may have fifteen cooling lines, while a large mold may have over a hundred cooling lines. The cooling lines 526 are all in communication with a coolant flow system (not shown), from which coolant is delivered to the cooling lines, and to which coolant returns after it flow through the cooling lines. Many coolant flow systems for dies are part of a plant-wide water system. Other coolant flow systems are "closed-loop" systems, in which coolant is only cycled through the coolant flow system.

The casting can be divided into multiple heat flow zones that are cooled by one or more cooling lines 526. The heat flow zones are generally indicated by the dotted boxes on FIG. 1B. The heat flow zones of the casting comprise the biscuit (Zone 0), the main runner (Zone I), the gate runner (Zone II), the gate side of the casting (Zone III), the overflow side of the casting (Zone IV), and the overflow (Zone V). The biscuit (Zone 0) generally corresponds to the biscuit 518. The main runner (Zone I) corresponds to the portion of the runners 620 that are closest to the biscuit 518. The gate runner (Zone II) corresponds to the portion of the runners 520 that is closest to the part cavity 508. The gate side of the casting (Zone III) is the casting half nearest to the gates 522. The overflow side of the casting (Zone IV) is the casting half furthest away from the gates 522. The overflow (Zone V) generally corresponds to the overflows 524.

There are primarily three critical die-casting process control requirements. The first requirement relates to the timing and function of the die casting machine. The timing of the opening and closing of the mold must be closely managed during the process to sequence operations such as injecting metal into the part, dealing with moving slides, making any intricate details in the casting, and extracting the part. The timing of these and other operations can be controlled to optimize the production rate and quality of the castings.

The second requirement relates to the injection processes at the shot end of the die casting machine. The injection processes, both from the standpoint of hardware and software, have been developed over time to optimize the control of injecting the liquid metal into the mold. Injection speed, injection pressure, and flow rate are all involved in the control of the injection process and can be taken into account during the design of the die casting process. Technologies have been developed to address the first two requirements in terms of machine design and shot end design to manage the first two problems that die casters have dealt with.

The third requirement relates to the thermal design, monitoring and control of the die casting process, including temperature detection and the removal of heat from the mold. Thermal design encompasses designing the cooling system of a die casting machine, which includes determining the number of cooling lines, the placement of each cooling line relative to the part cavity, the depth of each cooling line relative to the die surface, using the appropriate size, i.e. diameter, of cooling line, and determining the appropriate flow rate of each cooling line. Thermal monitoring refers to monitoring temperature and heat during the actual use of the die. Thermal control encompasses taking the information gathered from thermal monitoring and responding to that information, with respect to the intended thermal design.

Thermal design has historically been haphazard in the engineering of die casting processes. This is partly because the mathematics involved in thermally designing a die can be complex.

Thermal monitoring and control has to be almost nonexistent in the die casting industry, although a few attempts have been made in the field to monitor temperatures and flow rates. Some dies employ simple flow monitoring devices that are essentially mechanical flow meters to monitor the flow rate of coolant through cooling lines.

From a theoretical standpoint, the thermocouples can be used to determine the die surface temperature. Typically, a thermocouple is placed by drilling a hole to a location between the die surface and the cooling line surface, usually approximately halfway between the die surface and the cooling line surface. In use, the die surface temperature may be as high as 700 to 800 degrees Fahrenheit, while the cooling line surface temperature may be 100 degrees, and there may be less than one inch between the die surface and the water line surface. Therefore, a steep thermal gradient exists between the die surface and the water line surface, and the thermocouple is located within this steep thermal gradient. The location of the thermocouple within the temperature gradient, i.e. the distance of the thermocouple from the die surface, is used to determine the temperature at the die surface.

One problem with using thermocouples to monitor temperature lies in accurately placing the thermocouple at a desired location. Thus far, thermocouples have proved unreliable in determining the die surface temperature. Because it is difficult to drill in a straight line though the mold, it is almost impossible to know the exact location of the thermocouple within the temperature gradient. This is highly undesired, since even small deviations from the planned location of the thermocouple can result in large inaccuracies in temperature. For example, if the end of the drilled hole is off by $1/10$ inch in either direction, the location of the thermocouple within the temperature gradient may cause a $\pm 25$ to 50 degree Fahrenheit variation in the temperature measured.

Another problem associated with using thermocouples to monitor temperature are in their physical functionality. Thermocouples require adequate contact with the mold for accurate thermal measurement, but thermocouples are often difficult to seat properly within the drilled hole. J- and K-type thermocouples, the type of thermocouples used in die casting processes, do not have a high level of accuracy when it comes to die casting process, because they have a read error from 1 to 2.5%. Thermocouples often can break and must be replaced. Thermocouples have wires that come out of the die that must be plugged into a box to measure the temperature from the thermocouple, and these wires can be easily cut or otherwise damaged. Die setup can vary from 30 minutes to eight hours, and the list of items that must be completed in the setup is on the order of 30 to 100 different specific things that must be done to remove a mold and put a new mold into the die. Adding to that process by having to connect and verify the function of thermocouples is not very desirable.

Yet another problem associated with using thermocouples to monitor temperature is that thermocouples can only be used in select areas within the mold. Areas such as the biscuit, the runner system, the overflows, and slides cannot be fitted with thermocouples, and so the temperature of these areas of the mold are not monitored.

Thermal control using information supplied by thermocouples in past die casting systems has been rudimentary at best. The data supplied by thermocouples can be tracked and used for correlation with product quality. Some die casting systems are configured to turn coolant flow on or off based upon thermocouple readings, in which case there is no respect for the heat removed from the mold. One issue with this practice is that it can induce some thermal variation into the die casting process because there is a lag between the temperature the thermocouples are detecting and the temperature at the surface of the mold. Turning coolant flow on and off creates a sinusoidal temperature variation at the mold surface.

Another problem with current die casting thermal monitoring, and control is that little emphasis has been given to dimensional accuracy and precision in relation to gas porosity defects. The die casting process has long been considered a net shape process, but not an accurate one. The reason behind the poor dimensional accuracy and precision is that the injection temperature of the liquid metal varies in different sections of the casting, and the casting is ejected at an inconsistent temperature, the shrinkage that the casting undergoes will be inconsistent as well since the entire casting has to cool down to ambient temperature. For example, if one section of the casting is at a temperature of 800 degrees Fahrenheit at ejection, and another section of the casting is at 300 degrees Fahrenheit at ejection, the section at 800 degrees Fahrenheit will undergo more shrinkage than the section at 300 degrees Fahrenheit. This inconsistent shrinkage will create distortion and dimensional inaccuracy in the casting, which will force the utilization of machining operations to achieve reasonable dimensional control.

Another problem associated with poor thermal monitoring and control occurs during the process of ejecting the casting from the mold. If there is a "hot spot" in the die, i.e. a portion of the die that retains more heat than the rest of the die, ejection is delayed because that areas of the casting must cool longer than the rest of the casting, which means that the remainder of the casting will be cooler than it needs to be for ejection. When the casting cools too long within the mold, it can contract around details in the die, and may then require significant force to eject the casting, which can cause distortion or cracking of the casting. Waiting for the portions of the casting near the "hot spots" to cool also results in longer cycle times.

"Hot spots" in the die may also cause soldering to occur, which is when the temperature of a portion of the die is so high that the die spray burns off and the casting sticks inside the part cavity. The casting may still be ejected, but some of the casting material may stick to the die and oxidize.

SUMMARY OF THE INVENTION

The present invention focuses on the thermal aspects of the die casting process. In accordance with the present invention, a method for monitoring and/or controlling a die casting operation in a die casting machine comprising a die having an internal die surface defining a cavity fluidly interconnected to a shot of material to be introduced into the cavity for forming a part from the material after it is introduced into the cavity and cooled for a desired period of time, the die further comprising at least one cooling line extending through the die spaced from the cavity, each of the at least one cooling line having coolant passing therethrough at a coolant flow rate, an inlet wherein the coolant is at an inlet temperature and an outlet wherein the fluid is at an outlet temperature is presented.

According to one aspect to the invention, the method comprises the steps of determining a heat removed by each of the at least one cooling line and controlling the coolant flow rate through each of the at least one cooling line in response to the step of determining the heat removed.

According to another aspect of the invention, the method comprises the steps of determining a heat removed by each of the at least one cooling line for each shot of material and determining a cooling line surface temperature for each of the at least one cooling line.

According to yet another aspect of the invention, the method comprises the steps of heating the die surface from a first temperature to a target die surface temperature and generating a predetermined startup coolant flow rate chart which plans a desired coolant flow rate from a first flow rate to a target flow rate to attain the target die surface temperature in as few shots as possible, wherein the die cavity is maintained at the target die surface temperature prior to the flow rate reaching the target flow rate.

BRIEF DESCRIPTION OF THE DRAWINGS

A complete understanding of the present invention may be obtained by reference to the accompanying drawings, when considered in conjunction with the subsequent, detailed description, in which:

FIG. 4 illustrates an exemplary flow rate startup chart generated in accordance with the method detailed in the flowchart of FIG. 3.

For purposes of clarity and brevity, like elements and components will bear the same designations and numbering throughout the Figures.

DESCRIPTION OF THE PREFERRED EMBODIMENTS

The present invention sets forth a thermal monitoring and control system for a die casting operation. Through the integration between die design and die hardware, information about the design of the cooling system can be used to accurately control the amount of heat removed from the die casting mold. Aspects of the invention are applicable to "cold start" die casting operations, in which the die is unheated, as well as "hot start" die casting operations, in which there is some heat within the die left over from a previous die casting operation. While the method of the invention is described herein as having particular application to die casting operations, the method can also be generally applied to permanent mold casting, injection molding, plastic molding, and other forming operations.

I. Thermal Monitoring and Control Method

Figure 1A:
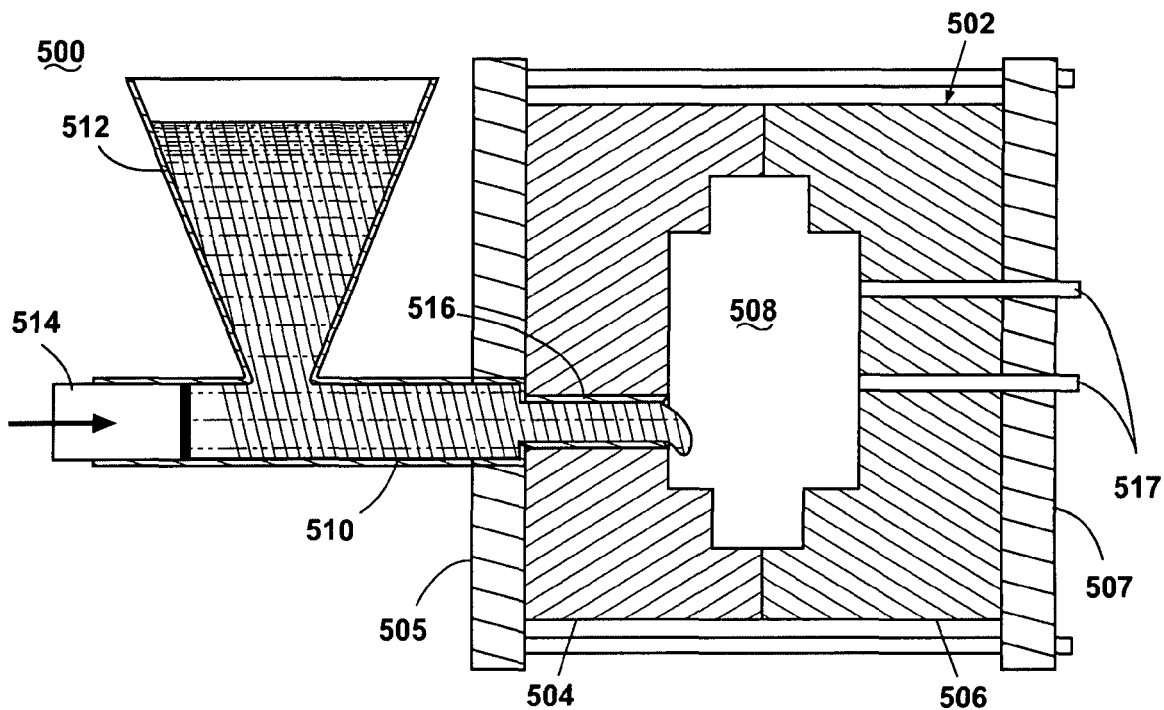
FIG. 1A is a schematic illustration of a typical cold chamber die casting machine.
Figure 1B:
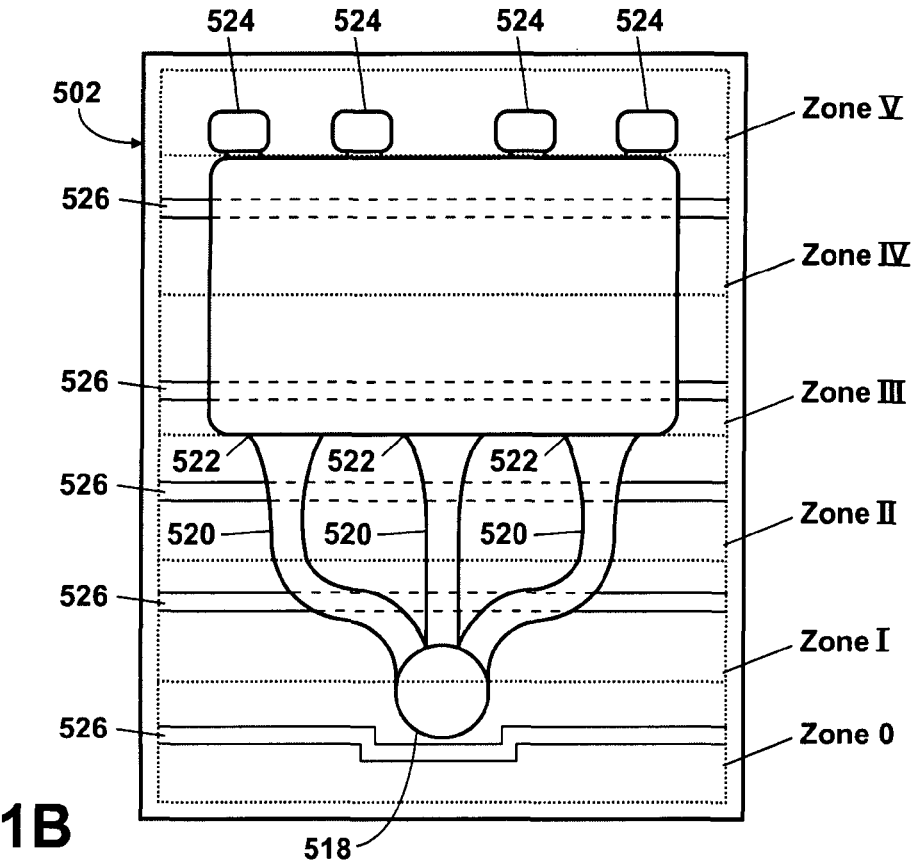
FIG. 1B is a schematic illustration of a typical cold chamber die casting die or mold.
Figure 2:
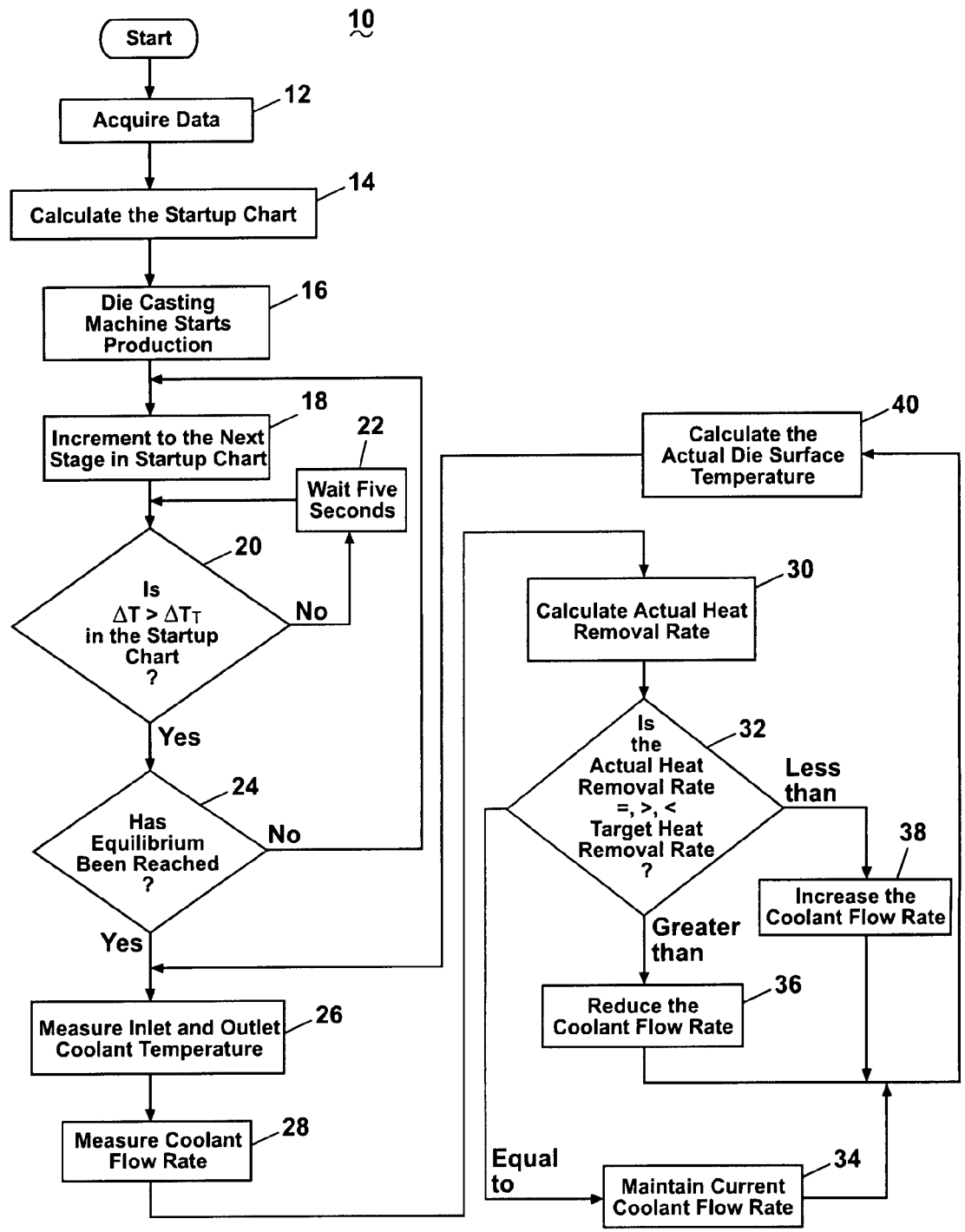
FIG. 2 is a flowchart detailing the steps of a "cold start" thermal monitoring and control method according to the invention.

A flowchart of an exemplary "cold start" thermal monitoring and control method 10 that can be used to monitor and control the thermal aspects of a die casting operation within a die according to the invention in presented in FIG. 2. The method 10 is described as being a "cold start" method since the die is unheated at the beginning of the die casting operation. The first portion of the method relates to generating a startup routine, and monitoring and controlling the flow of coolant though the cooling lines of the die in accordance with the startup routine until a state of equilibrium is reached between the desired die temperature and the coolant flow rate. The second portion of the method relates to maintaining the state of equilibrium by monitoring coolant temperature and coolant flow rate, and by controlling the coolant flow rate. Unless otherwise noted, each step of the monitoring and control method 10 are completed individually for each cooling line of the die. For the sake of clarity, the steps will usually be discussed in terms of only one cooling line of the die. The exemplary design method 10 is provided for illustrative purposes only and is not intended to limit the invention in any manner. It is understood that reasonable variation and modification of the sequence of the foregoing steps of the method 10 are possible without departing from the scope of the invention.

The monitoring and control method 10 begins with a step 12 of acquiring data related to the die casting design and process. The data can be acquired through any suitable means, such as by user entry or by downloading the data from a database. The data is acquired for each cooling line of the die and includes, but is not limited to, the target heat removal rate $Q_0$, the target coolant flow rate $F_0$, the target die surface temperature $T_{D0}$, the target cooling line surface temperature $T_{CL0}$ the type of cooling line (i.e. the size or diameter of the cooling line), the target amount of heat removed per shot $H_0$, the number of shots per hour S (i.e. the shot rate), the number of shots until the coolant is turned on, the cooling constant k of the die material, the distance W between the cooling line surface and the die surface, the density D of the coolant, and the cooling line length L.

These values can be determined by the user using any suitable calculations or methods. For example, the target heat removal rate $Q_0$ can be determined by selecting, for each cooling line of the die, a suitable target flow rate $F_0$, the target amount of heat removed per shot $H_0$, the shot rate S, and the cooling line length L. From these values, the target heat removal rate for a cooling line can be calculate using equation $$Q = \frac{H \cdot S}{L} \quad (1)$$

where H is the target amount of heat removed per shot $H_0$ for the purposes of calculating the target heat removal rate $Q_0$, denoted by Q.

The target cooling line surface temperature $T_{CL0}$ for each cooling line can determined from the calculated target heat removal rate $Q_0$ using regression analysis applied to a set of actual test data to determine one or more regression equations that best fit the test data. The actual test data may be the measured heat removal rate of a cooling line at varying coolant flow rates, where the diameter of the cooling line and the cooling line surface temperature are known values or constants. Regression analysis of such test data results in a series of fourth order regression equations. For a given cooling line surface temperature, the regression equations can generally be expressed as:

$$y=a+bx+cx^2+dx^3 \qquad (2)$$

where the variable y is the heat removal rate, the variable x is the coolant flow rate and the "constants" a, b, c, and d are the regression parameters estimated by the regression analysis.

The regression equations can be used to estimate the target cooling line surface temperature $T_{CL0}$ for a cooling line having a given heat removal rate, such as the target heat removal rate $Q_0$, and a given cooling line type. However, because the regression equations are limited by the cooling line surface temperatures from the test data, interpolation may be used to estimate the target cooling line surface temperature for a cooling line having a target heat removal rate between values for two of the regression equations.

Advantageously, the design method disclosed in a U.S. patent application filed concurrently herewith, and titled "Die Casting Design Method and Software", may be used to determine the data values acquired in step 12. Using the design method and the software described in the concurrently-filed application, these values can be predetermined and saved in a database or other suitable data storage device.

In step 14, a startup routine for a die casting operation is determined by generating a startup chart for a cooling line of the die based on the data acquired in step 12. The startup chart details the necessary flow rate of the coolant to maintain a suitable rate of heat removal from the die so that the die is being properly cooled.

Figure 3:
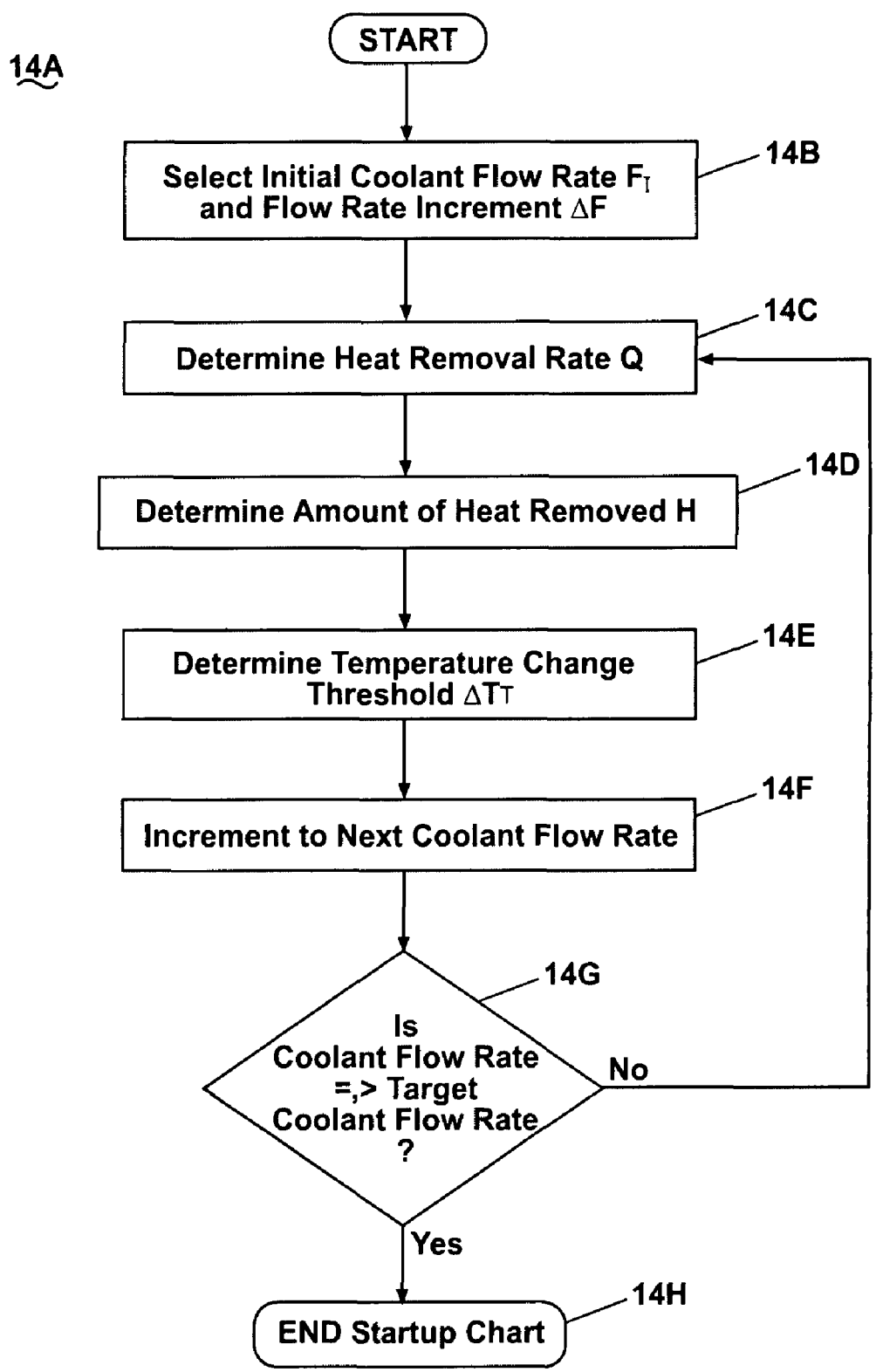
FIG. 3 is a flowchart detailing the steps of generating a flow rate startup chart in accordance with a step of the thermal monitoring and control method detailed in the flowchart of FIG. 2.

The startup chart can be generated by a method 14A shown in a flowchart illustrated as FIG. 3. The method 14A begins with a step 14B of choosing an initial or starting coolant flow rate $F_I$ and a flow rate increment $\Delta F$. The starting coolant flow rate is the flow rate of the coolant at the beginning of the first shot of a die casting operation. The starting coolant flow rate can be low, since the die is at a relatively low temperature during the first shot, and a low coolant flow rate is sufficient to maintain the die at a suitable temperature. The flow rate increment is the change in the flow rate between stages of the startup chart.

In step 14C, the heat removal rate Q needed to maintain the cooling line at the target cooling line surface temperature $T_{CL0}$ is determined. The regression equations described in step 12 can be used to estimate the heat removal rate for a cooling line at the target cooling line surface temperature and having coolant therein flowing at the starting or current flow rate.

In step 14D, the amount of heat removed per shot H can be determined from the heat removal rate Q, using Equation (1).

Then, in step 14E, the temperature change threshold $\Delta T_T$ is determined. The temperature change threshold is the point at which the temperature different between the inlet coolant temperature and the outlet coolant temperature becomes great enough that the die is not properly being cooled, and the coolant flow rate must be increased. The temperature change threshold can be calculated using the equation $$\Delta T_T = \frac{H}{D \cdot F} \qquad (3)$$

where D is the density of the coolant, F is the starting coolant flow rate $F_1$ and H is the amount of heat removed per shot needed to maintain a cooling line having coolant flowing through it at the starting flow rate $F_I$ at the target cooling line surface temperature $T_{CL0}$ determined in step 12.

Next, in step 14F, the coolant flow rate is increased by the flow rate increment determined in step 14B, and in step 14G, the incremented coolant flow rate is compared to the target coolant flow rate $F_0$. If the coolant flow rate is less than the target flow rate, the method 14A returns to step 14C and the heat removal rate Q, the amount of heat removed per shot H, and the temperature change threshold $\Delta T_T$ values are determined according to steps 14C-14E for the particular coolant flow rate. Steps 14F and 14G are also repeated. In this way, a startup chart similar to the chart shown in FIG. 4 can be generated.

If the coolant flow rate is equal to or greater than the target flow rate, the method 14A continues to step 14H, in which a startup chart similar to the chart shown in FIG. 4 is finished and the method 14A ends. The monitoring and control method 10 may then move on to step 16.

In step 16, the die casting machine begins production and a first casting cycle will commence with a first shot of casting material being injected into the die. The die casting machine can comprises hardware, such as a controller, to effect the automatic control of the die casting operation in accordance with these steps of the method 10. Otherwise, the method may be carried out manually. In step 18, the die casting machine moves incrementally to the next stage number in the chart shown in FIG. 4. During the beginning of the first casting cycle, step 18 corresponds to moving to Stage 1 of the startup chart shown in FIG. 4, in which the coolant flow is at the starting coolant flow rate $F_I$.

In step 20, the inlet temperate $T_I$ and outlet temperature $T_O$ of the coolant is measured, and the temperature change $\Delta T$ is calculated using equation $$\Delta T = T_O - T_I \qquad (4)$$

and is compared to the value of the temperature change threshold $\Delta T_T$ in the startup chart for the current stage. If the actual $\Delta T$ is not greater than $\Delta T_T$ the controller will wait a predetermined period of time, as indicated by step 22 and then return to step 20 to again compare the measured $\Delta T$ to the $\Delta T_T$ in the startup chart. The controller will reciprocate between steps 20 and 22 until the measured $\Delta T$ is greater than the value in the graph. When this is determined to be the case, the method 10 will move on to step 24.

In step 24, the controller determines if a state of equilibrium has been reached between the desired die temperature and the coolant flow rate. As shown in the exemplary graph of FIG. 5, which compares the changes in the temperature of the die and the coolant flow rate per shot from the start of the die casting operation monitored and controlled in accordance with method 10, a state of equilibrium is reached when both the die temperature and the coolant flow rate reach 100% of their target values, which are determined from the data acquired in step 12. The x-axis denotes the number of shots completed during the die casting operation. Each shot corresponds to one casting cycle of the die casting machine, which results in one casting or part being made. The die casting operation will commence with a first shot of casting material being injected into the die. This corresponds to Shot Number 1 on the graph shown in FIG. 5. The y-axis denotes the percentage of desired die temperature and water flow rate.

If a state of equilibrium has not been reached, the method 10 will return to step 18, in which the die casting machine moves incrementally to the next stage in the startup chart shown in FIG. 4. The method 10 will cycle through steps 18-24 until it is determined that a state of equilibrium has been reached, i.e. until the target coolant flow rate $F_0$ has been reached i.e. until Stage N of the startup chart is completed.

Once a state of equilibrium has been reached, the method 10 will move on to the remaining steps 26-40. Steps 26-40 of the method 10 insure that the die temperature and the coolant flow rate remain in a state of equilibrium or in a steady state.

In step 26, the inlet temperate $T_I$ and outlet temperature $T_O$ of the coolant is measured. The temperatures can be measured once during each shot. Alternately, the inlet and outlet temperatures can be measured multiple times at periodic rates during each shot and an average of the inlet and outlet temperatures from the multiple measurements can be determined. The average inlet and outlet temperatures is often more accurate because the heat of the shot can vary over time as the shot is delivered.

In step 28, the actual coolant flow rate F is measured. Like the temperature measurement in step 26, the coolant flow rate can be measured once during each shot, or multiple times at periodic rates during each shot. If multiple measurements are taken, an average coolant flow rate can be determined.

In step 30, the actual heat removal rate Q, which is the heat removed by each cooling channel per shot, is calculated based on the inlet temperate $T_I$ and outlet temperature $T_O$ measured in step 26, the actual coolant flow rate F measured in step 28, and the specific heat C and density D of the coolant using the equation $$Q = \Delta T \times F \times C \times D \quad (5)$$

where the temperature change $\Delta T$ is calculated according to Equation (4).

In step 32, the actual heat removal rate Q calculated in step 30 is compared to the target heat removal rate $Q_0$, which is predetermined in accordance with the data acquired in step 12, and a determination of whether the actual heat removal rate is equal to, greater than or less than the target heat removal rate is made. If the actual heat removal rate is equal to the target heat removal rate, the method 10 continues to step 34, in which the coolant flow rate is maintained at its current flow rate. If the actual heat removal rate is greater than the target heat removal rate, too much heat is being removed from the die by the coolant, and the method 10 continues to step 36, in which the coolant flow rate is reduced. If the actual heat removal rate is less than the target heat removal rate, not enough heat is being removed from the die by the coolant, and the method continues to step 38, in which the coolant flow rate is increased.

From either step 34, 36 or 38, the method moves on the step 40, in which the actual die surface temperature $T_D$ is determined. It is desirable in many casting operations to measure the actual die surface temperature, because the die surface temperature affects the surface finish of the casting. If die surface temperature is too low or too high, casting with poor surface finish may be produced. Also, the die surface temperature near or at ejection indicates what type of die spray may be used during ejection, because different die sprays are rated for different temperature ranges.

The actual die surface temperature $T_D$ can be determined from the average die surface temperature $T_{AVE}$, which in turn can be determined from the actual cooling line surface temperature $T_{CL}$. The actual cooling line surface temperature $T_{CL}$ can then be determined based on the actual flow rate F measured in step 28 and the actual heat removal rate Q calculated in step 30 by regression analysis using the regression equations discussed above. Depending on the units in which the heat removal rate was measured for the test data on which the regression equations are based, the actual heat removal rate Q calculated in step 30, which is expressed in terms of heat removed per shot, may need to be expressed in terms of heat removed per time per length using the equation $$Q_H = \frac{Q}{S \cdot L} \quad (6)$$

where $Q_H$ is the actual heat removal rate in terms of heat removed per time per length, and the shot rate S and the cooling line length L were acquired according to step 12. Interpolation may also need to be performed to determine the actual cooling line surface temperature.

The average die surface temperature $T_{AVE}$ is then calculated based on the distance W between the die surface and the cooling line surface, the die material cooling constant k and the shot rate S, acquired in step 12, and the actual heat removal rate Q calculated in step 30, using the equation $$T_{AVE} = T_{CL} + \frac{W \cdot Q}{k \cdot A \cdot S} \quad (7)$$

where A is the heat flow area. The heat flow area is the area of the casting surface in a vector extending from the casting surface to the cooling line, along the direction of the flow of heat. For any thermal gradient, heat will flow from the area of high temperature to the area of the low temperature. Therefore, in a die casting operation, heat will flow from the casting surface, which is at a higher temperature, to the cooling line, which is at a lower temperature. Heat flow area can be advantageously calculated from a three-dimensional model of the die, such as a CAD model.

Finally, the actual die surface temperature $T_D$ is determined from the average die surface temperature $T_{AVE}$ and the inlet temperature $T_I$ of the coolant measured in step 20. The relationship between the average die surface temperature and the inlet temperature can be expressed as $$T_{AVE} = \frac{(T_I - T_D)}{\ln\left(\frac{T_I}{T_D}\right)} \quad (8)$$

This relationship can be used to determine the actual die surface temperature $T_D$ through an iterative calculation process by which the inlet temperature $T_I$ is plugged into Equation (8) and the actual die surface temperature is varied until the calculated average die surface temperature $T_{AVE}$ is equal to the average die surface temperature determined above from Equation (7). The iterative calculation process can advantageously be completed automatically by the controller.

After step 40, the method 10 returns to step 26, and the method continues to cycle through steps 26-40 for the remainder of the die casting operation. Steps 26-40 are performed at least one per casting cycle, i.e. at least once per shot, or may be repeated more than one during a single casting cycle at a periodic rate. If the former is the case, the transition from step 40 to step 26 corresponds to the beginning of a new casting cycle.

Figure 6:
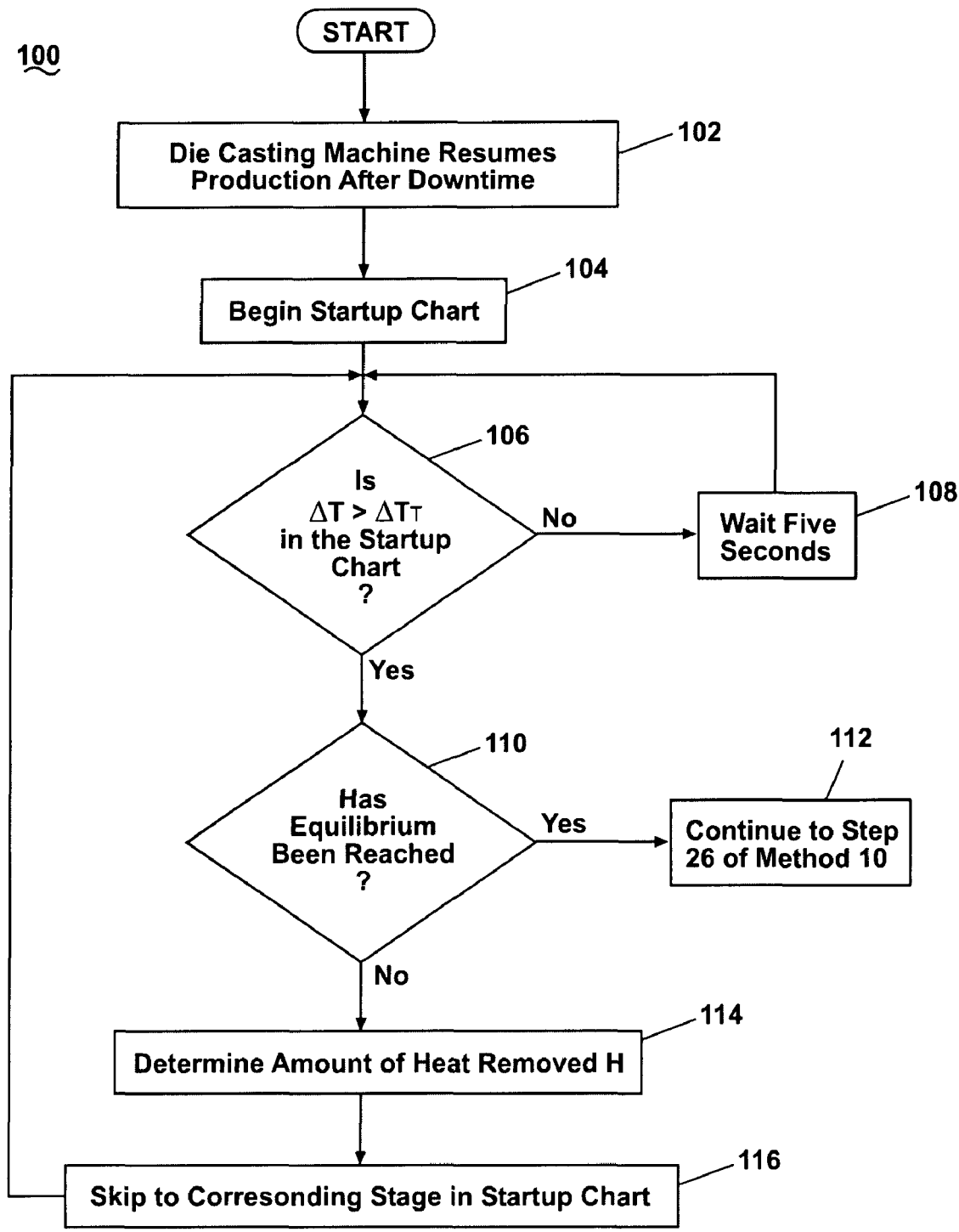
FIG. 6 is a flowchart detailing the steps of a "hot start" thermal monitoring and control method according to the invention.

A flowchart of an exemplary "hot start" thermal monitoring and control method 100 that can be used to monitor and control the thermal aspects of a die casting operation within a die according to the invention in presented in FIG. 6. Unless otherwise noted, each step of the monitoring and control method 100 are completed individually for each cooling line of the die. For the sake of clarity, the steps will usually be discussed in terms of only one cooling line of the die. The exemplary design method 100 is provided for illustrative purposes only and is not intended to limit the invention in any manner. It is understood that reasonable variation and modification of the sequence of the foregoing steps of the method 100 are possible without departing from the scope of the invention.

The method 100 is described as being a "hot start" method since the die is heated when the method 100 is initiated. The method 100 may be initiated if a downtime event occurs during a die casting operation. A downtime event causes the die casting machine to discontinue operation for a period of time, after which it may resume operation. Exemplary downtime events include manually shutting the die casting machine down for worker breaks or maintenance, or automatically shutting the die casting machine down when a limit switch fails. When the die casting machine resumes operation after a downtime event, some heat from the die casting operation prior to the downtime event may remain within the die. The method 100 takes the die heat into account when resuming operation after a downtime event.

If the downtime event is short, the die may not lose much heat and the die casting machine may be able to resume the die casting operation where it left off. The determination of whether to resume the previous die casting operation or to enter into the startup routine determined according to the method 100 is dependent on how long the downtime event has lasted. If the downtime event has lasted less than a predetermined period of time, the die casting machine may resume the die casting operation where it stopped. If the downtime event has lasted at least the predetermined period of time, the method 100 may initiate and the die casting machine may resume the die casting operation in accordance with a startup routine determined using method 100.

The monitoring and control method 100 begins with a step 102 of the die casting machine resuming production after a downtime event lasting longer than a predetermined period of time, such as longer than 1.5× of the target cycle time, and a first casting cycle post-downtime will commence with a first shot of casting material being injected into the die. In step 104, the startup chart shown in FIG. 4 is initiated at the first stage, in which the coolant flow is at the starting coolant flow rate $F_I$.

Steps 106, 108, and 110 are similar to steps 20, 22, and 24 of the method 10. In step 106, the inlet temperate $T_I$ and outlet temperature $T_O$ of the coolant is measured, and the temperature change $\Delta T$ calculated using Equation (4) is compared to the value of the temperature change threshold $\Delta T_T$ in the startup chart for the current stage. If the actual $\Delta T$ is not greater than $\Delta T_T$ the controller will wait a predetermined period of time, as indicated by step 108 and then return to step 106 to again compare the measured $\Delta T$ to the $\Delta T_T$ in the startup chart. The controller will reciprocate between steps 106 and 108 until the measured $\Delta T$ is greater than the value in the graph. When this is determined to be the case, the method 10 will move on to step 110.

In step 110 the controller determines if a state of equilibrium has been reached between the desired die temperature and the coolant flow rate. In step 112, if a state of equilibrium has been reached, the method 10 will be initiated at step 26. Monitoring and control of the die casting operation will be carried out in accordance with steps 26-40 of the method 10 to ensure that the die temperature and the coolant flow rate remain in a state of equilibrium or in a steady state.

If a state of equilibrium has not been reached, the method 100 will move on to step 114, in which the amount of heat removed per shot H is determined. This can generally be accomplished in the same way the heat removed per shot H is determined for the startup chart in step 14D of method 14A.

In step 116, the startup chart is referred to determine which stage the amount of heat removed per shot H determined in step 114 corresponds to, and the die casting machine "skips" to that stage. The coolant flow rate is set to the coolant flow rate for that stage, and the method 100 returns to step 106. Using this approach, the coolant flow rate will catch up with the heat level in the die so that quality castings may be produced in fewer casting cycles. The method 100 will cycle through steps 106-116 until it is determined that a state of equilibrium has been reached.

II. Control Module

As briefly described above, the monitoring and the control methods 10, 100 can be carried out by the hardware of a die casting machine. One type of hardware that can be utilized can be referred to as a "thermocouple-less" thermal control module. The control module will control heat removal rate and thus the desired die temperature by controlling the flow rate of the cooling medium in accordance methods 10, 100. In general, the control module works by monitoring the difference in temperature between the inlet and the outlet cooling lines. The control module maintains the desired heat removal rate by determining the actual heat removal rate at periodic intervals from the inlet and outlet coolant temperatures. If the heat removal rate is too high or too low, the coolant flow rate can be increased or decreased to achieve a desired heat removal rate. This can be accomplished by adjusting a control valve to maintain the appropriate flow rate to achieve the desired heat removal rate. The desired heat removal rate can be predetermined during the design of the die and refined in process development. The desired heat removal rate can be pre-set in the control module.

Figure 7:
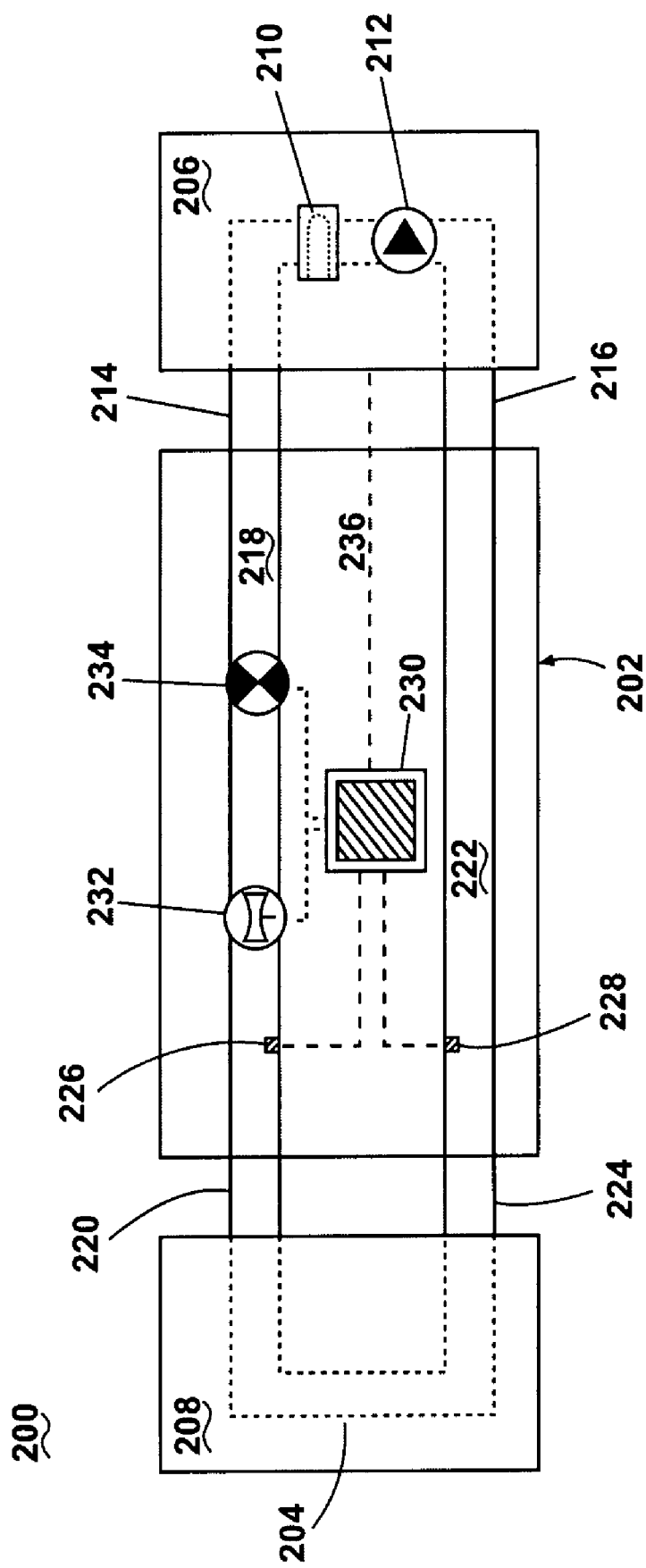
FIG. 7 is a schematic illustration of an exemplary control module assembly comprising a control module operably coupled between a cooling line and a chiller/pump assembly.

FIG. 7 is a schematic illustration of an exemplary die casting system 200 comprising a control module 202 that can be used to carry out methods 10, 100. In general, the control module 202 maintains the target heat removal rate $Q_0$ by resolving Equation (5) on a periodic basis to determine the actual heat removal rate Q and adjusting the coolant flow rate F according to how the actual heat removal rate compares to the target heat removal rate.

The control module 202 is operably coupled between a cooling line 204 and a chiller/pump assembly 206. The cooling line 204 extends through a die 208 to cool a portion of the die 208. The control module 202 may be used to effect the monitoring and control method 10 discussed above for the entire die 208, or for one heat flow zone of the die 208. In the latter case, the die casting system 200 can comprise a control module 202 for each heat flow zone of the die 208. For clarity's sake, only one cooling line 204 is shown, but it is understood that some control modules 202 may comprise multiple cooling lines 204, with the chiller/pump assembly 206 being common to all cooling modules 202.

The chiller/pump assembly 206 comprises a chiller 210 for maintaining the coolant at a desire standard temperature and a pump 212 which provides for the delivery and return of coolant to and from the control module 202, which is fluidly interconnected with the chiller/pump assembly 206.

The control module 202 comprises a module inlet 214 which supplies coolant to the cooling line 204 and a module outlet 216 with returns coolant to the chiller/pump assembly 206. Inside the control module 202, there is a first coolant chamber 218 extending from the module inlet 214 to a cooling line inlet 220 and a second coolant chamber 222 extending from a cooling line outlet 224 to the module outlet 216.

The cooling line inlet 220 and the cooling line outlet 224 are in fluid communication with the cooling line 204.

Each coolant chamber 218, 222 comprises a temperature measuring device 226, 228 that is configured to measure the temperature of the coolant within the respective coolant chamber 218, 222. Accordingly, the first temperature measuring device 226 measures the temperature of the coolant before it enters the die 208 and the second temperature measuring device 228 measures the temperature of the coolant after it has flowed through and cooled the die. The temperature measuring devices 226, 228 may comprise any suitable device for measuring temperature of the coolant. One suitable temperature measuring device is a Resistance Temperature Detector ("RTD") or a thermistor.

The temperature measuring devices 226, 228 are operably coupled to a main controller 230, which is in turn operably coupled to a flow monitor 232 and a flow controller 234. The main controller 230 is configured to receive information about the temperature of the coolant within the coolant chambers 218, 222 from the temperature measuring devices 226, 228 and about the coolant flow rate through the first coolant chamber 218 from the flow monitor 232. Based on this information, the main controller 230 will generate a control signal that controls the coolant flow rate through the cooling line 204. The main controller 230 is also operably connected to the chiller/pump assembly 206, as indicated by line 236, so that the main controller 230 may determine if the chiller/pump assembly 206 is operational and is chilling coolant to the desired standard temperature. The main controller can comprise a programmable logic controller ("PLC").

The flow monitor 232 is configured to monitor the coolant flow rate through the first coolant chamber 222 and generate a signal indicative of the coolant flow rate which is received by the main controller 230. In one contemplated arrangement, the flow monitor 232 can generate and send a signal to the main controller 230 every time a specific volume of coolant passes the flow monitor 232. The flow monitor 232 may comprise any suitable device for monitoring the coolant flow rate. One suitable flow monitor 232 is known as a paddle wheel device.

The flow controller 234 is configured to control the coolant flow rate through the first coolant chamber 222 based on a control signal generated by the main controller 230. The flow controller 234 can comprise a dumb device that changes the size of an orifice through which coolant flows in response to a control signal generated by the main controller 230. If the control signal indicates that the coolant flow rate needs to be increased, the orifice will be increased in size. If the control signal indicates that the coolant flow rate needs to be decreased, the orifice will be decreased in size.

In operation during a die casting operation, the main controller 230 receives a signal indicating the inlet temperate $T_I$ from the first temperature measuring device 226, a signal indicating the outlet temperature $T_O$ from the second temperature measuring device 228, and a signal indicated the coolant flow rate F from the flow monitor 232, and calculates the actual heat removal rate Q using Equation (5). The specific heat C and density D of the coolant can be pre-programmed into the main controller 230.

The main controller 230 then compares the actual heat removal rate Q to the target heat removal rate $Q_0$ and may generate a control signal based upon the outcome of the comparison. If the actual heat removal rate is greater than the target heat removal rate, the main controller 230 generates a control signal that instructs the flow controller 234 to reduce the coolant flow rate. If the actual heat removal rate is less than the target heat removal rate, the main controller 230 generates a control signal that instructs the flow controller 234 to increase the coolant flow rate. If the actual heat removal rate is equal to the target heat removal rate, the main controller 230 may not generate a control signal, or may generate a control signal instructing the flow controller 234 to maintain the current coolant flow rate.

The flow controller 234 can be configured to adjust the coolant flow rate in discrete intervals. The number of discrete intervals can be determined according to the difference between the actual heat removal rate and the target heat removal rate. For example, if the actual heat removal rate is within 5% of the target heat removal rate, the coolant flow rate is adjusted one discrete interval, if the actual heat removal rate is within 33% of the target heat removal rate, the coolant flow rate is adjusted five discrete intervals, and if the actual heat removal rate is any further off than within 33% of the target heat removal rate, the coolant flow rate is adjusted twenty-five discrete intervals.

The flow controller 234 can alternately be infinitely adjustable to proportionally control the coolant flow rate in accordance with the difference between the actual heat removal rate and the target heat removal rate.

Figure 8:
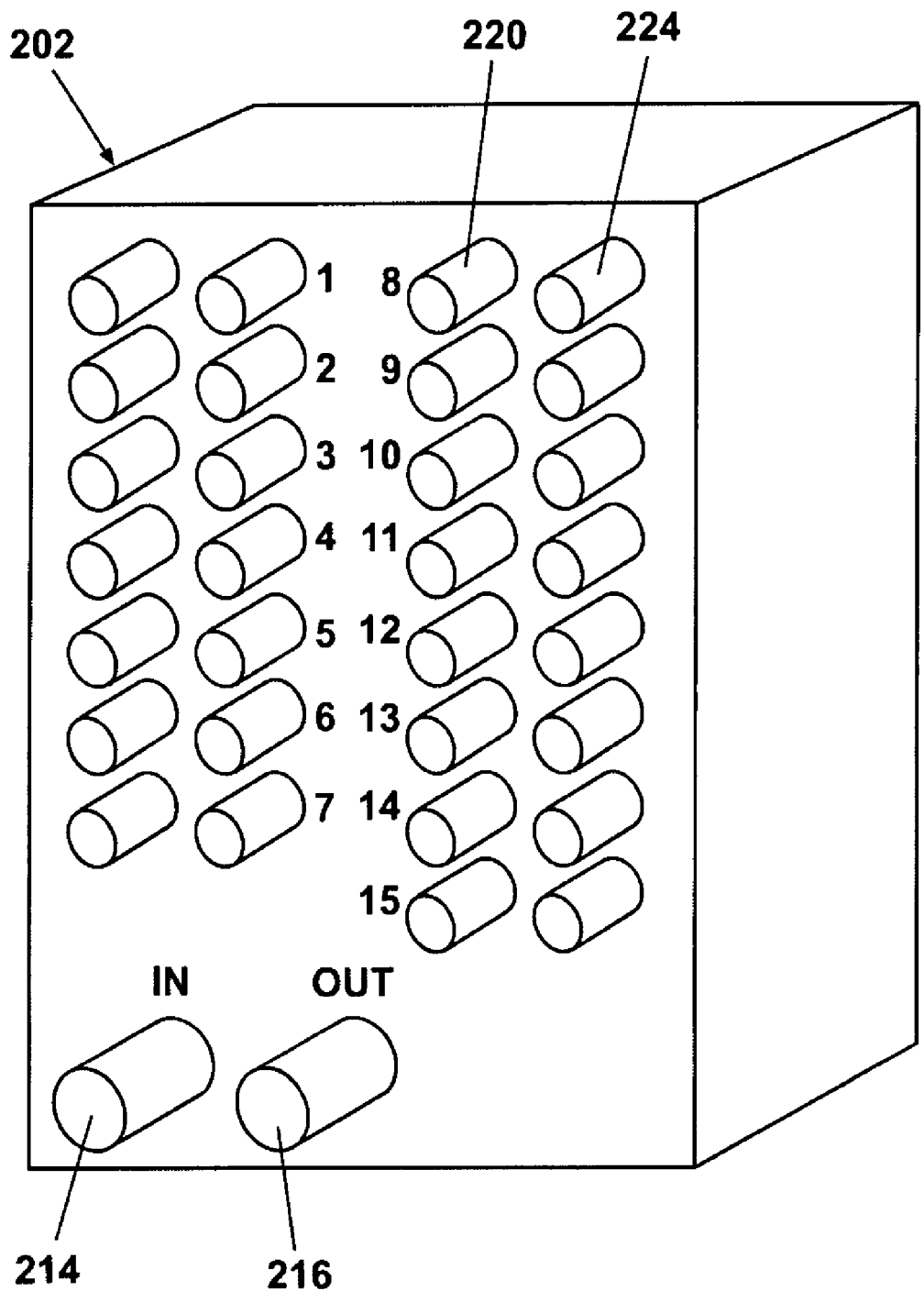
FIG. 8 is a schematic illustration of a manifold for use with the control module assembly of FIG. 7.

FIG. 8 is a schematic illustration of a control module 202 for use with the die casting system 200 of FIG. 7. The control module 202 enables multiple cooling lines 204 to be operably connected to the chiller/pump assembly 206. Essentially, the control module 202 comprises an inner manifold (not shown) that divides coolant from the chiller/pump assembly 206 into an individual supply for each of the cooling lines 204 and consolidates the coolant returned from each cooling line 204 before returning to the chiller/pump assembly 206. The control module 202 comprises multiple cooling line inlets 220 and cooling line outlets 224; each cooling line inlet 220 is paired with a cooling line outlet 224 to form an inlet/outlet set which is interconnectable to one cooling line 204. As illustrated, there are fifteen inlet/outlet sets; therefore, up to fifteen cooling lines 204 can be connected to the control module 202. The module inlet 214 is in fluid communication with each cooling line inlet 220 and the module outlet 216 is in communication with each cooling line outlet 224.

Figure 9:
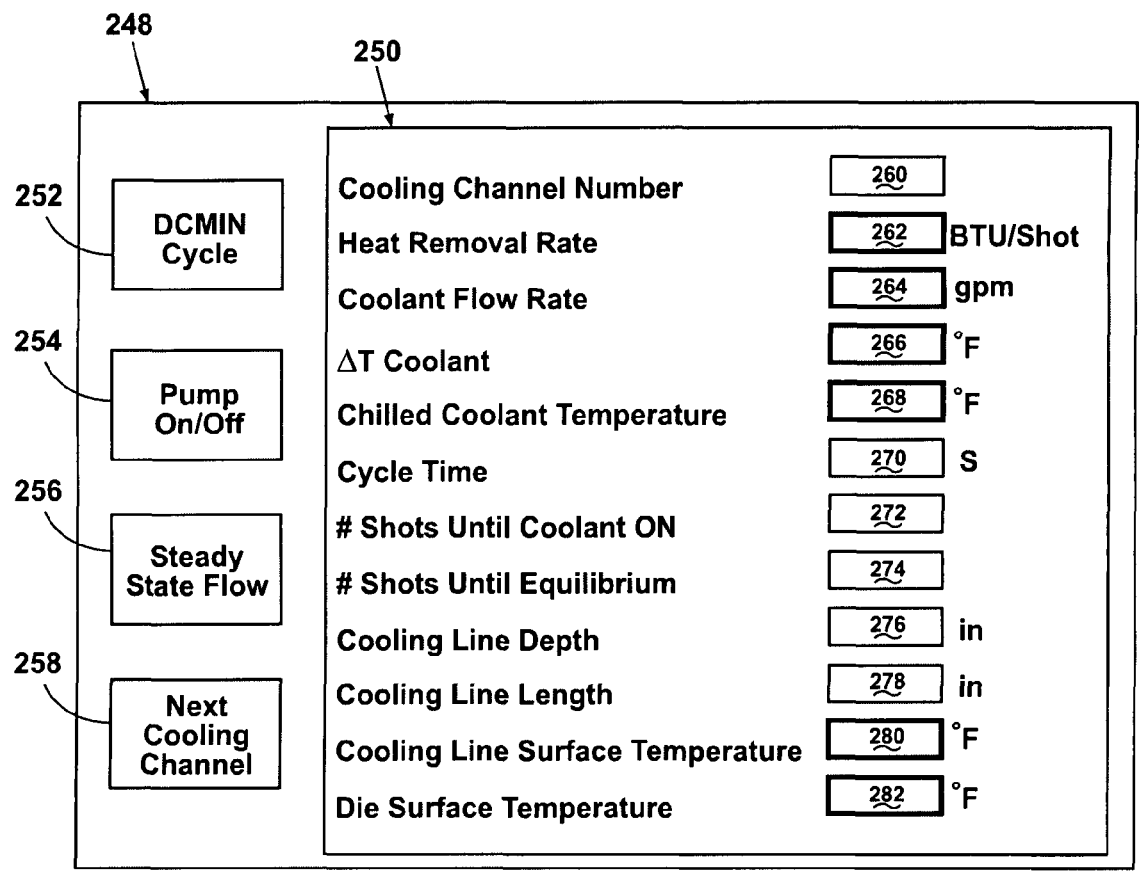
FIG. 9 is a schematic illustration of a user interface for use with the control module assembly of FIG. 7.

FIG. 9 is a schematic illustration of a user interface 248 for use with the die casting system 200 of FIG. 7. The user interface 248 is operably connected to the main controller 230 of the control module 202 and comprises a screen 250 for displaying information related to the die casting operation for a selected cooling line. Alternately, the screen 250 could display information related to the die casting operation for all cooling lines in the die at once.

The user interface 248 comprises several indicators 252, 254, 256 for providing an indication of the condition of the die casting operation. Indicator 252 ("DCM in Cycle") indicates whether the die casting machine is in operation. Indicator 254 ("Pump On/Off") indicates whether the pump of the chiller/pump assembly 206 is in operation. Indicator 256 ("Steady State Flow") indicates whether the target coolant flow rate has been reached in a selected cooling line. The indicators 252, 254, 256 can be dummy lights which are illuminated when the condition of the die casting operation is positive, i.e. when the die casting machine or the pump is operating and when the selected cooling line has reached its target coolant flow rate. A button 258 is provided that allows the user to select the cooling line for which information is displayed on the screen 250 and for which the status is indicated by the indicator 256.

The screen 250 comprises multiple data fields in which information related to the die casting operation for a selected cooling line is shown to the user. The data in the fields can be displayed in real time. A description indicative of the information shown in each data field is provided to the left of each data field, and the unit of measure, if any, for the information shown in each data field is provided to the right of each data field. It is understood that units of measure other than those shown herein may be used.

Data field 260 ("Cooling Channel Number") displays the number of the selected cooling line for which information is beings shown on the screen 250. Data field 260 may also shown the heat flow zone of the cooling line.

Data field 262 ("Heat Removal Rate") displays the actual heat removal rate Q for the selected cooling line as determined by the main controller 230 of the control module 202.

Data field 264 ("Coolant Flow Rate") displays the actual coolant flow rate F for the selected cooling line as measured by the flow monitor of the control module 202.

Data field 266 ("ΔT Coolant") displays the coolant temperature change ΔT, which can be calculated using Equation (4) using the outlet temperature $T_O$ and the inlet temperature $T_I$ determined by the temperature measuring devices of the control module 202.

Data field 268 ("Chilled Coolant Temperature") displays the temperature of the coolant within the chiller/pump assembly 206 of FIG. 7.

Data field 270 ("Cycle Time") displays the time to complete one casting cycle, i.e. the cycle time. The cycle time can be displayed as a counter of the time spent on the current casting cycle.

Data field 272 ("# Shots Until Coolant On") displays the number of shots required until coolant begins to flow through the selected cooling line.

Data field 274 ("# Shots Until Equilibrium") displays the number of shots required until a state of equilibrium is reached, i.e. until when both the die surface temperature and the coolant flow rate reach their target values.

Data field 276 ("Cooling Line Depth") displays the distance W from the surface of the selected cooling line and the die surface.

Data field 278 ("Cooling Line Length") displays the length L of the selected cooling line.

Data field 280 ("Cooling Line Surface Temperature") displays the cooling line surface temperature $T_C$ for the selected cooling line.

Data field 282 ("Die Surface Temperature") displays the actual die surface temperature for the portion of the die surface that is adjacent to the selected cooling line.

III. Benefits

A die casting machine employing the monitoring and control methods 10, 100 and/or the control hardware according to the invention offers many benefits over prior art dies. In monitoring and controlling the removal of heat from the die for each cooling line, the die casting operation is controlled in accordance with the design of the die. Shot-to-shot consistency can be improved.

Figure 5:
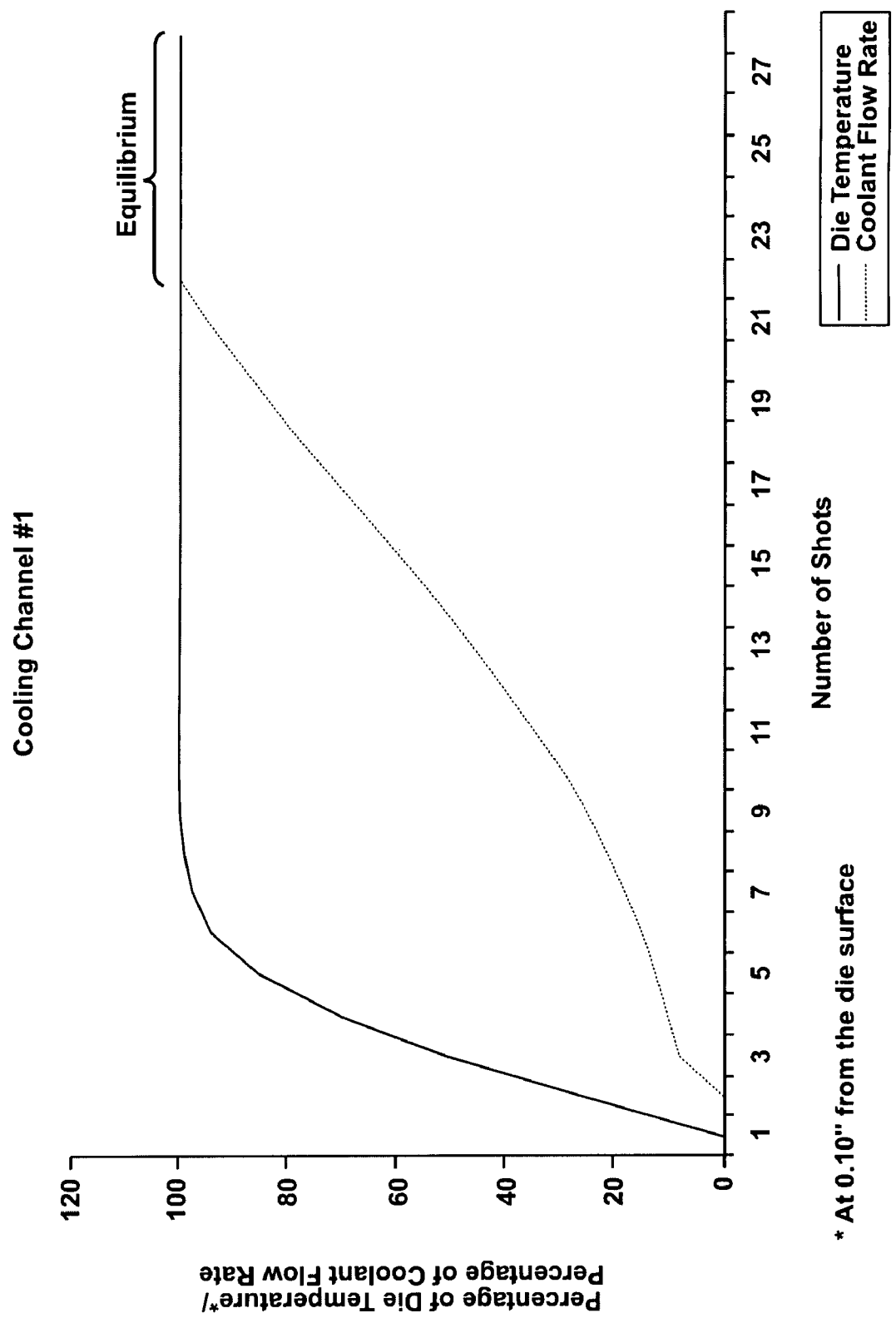
FIG. 5 is an exemplary graph comparing the changes in die temperature and coolant flow rate per shot during a die casting operation monitored and controlled in accordance with the present invention.
Figure 10:
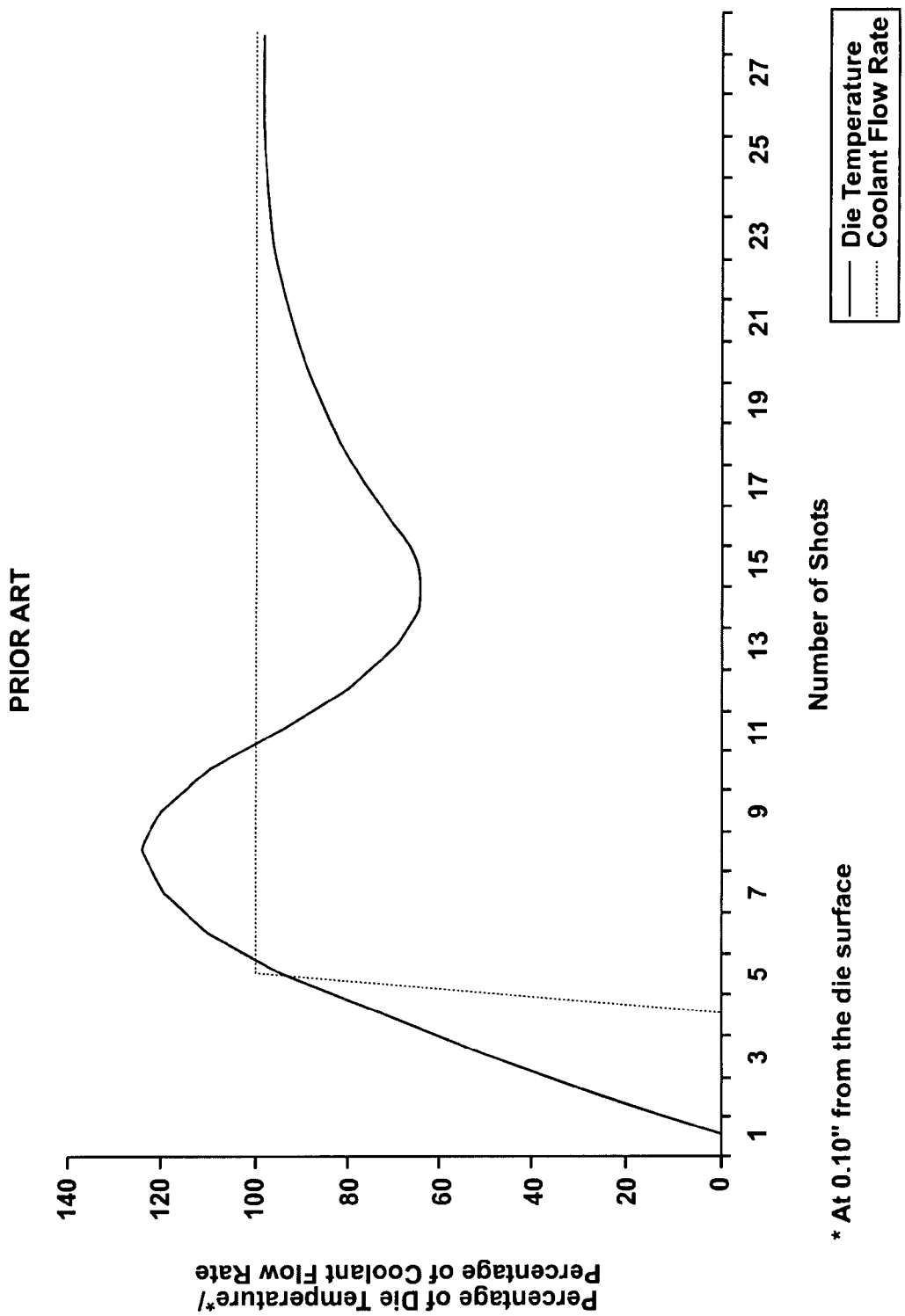
FIG. 10 is an exemplary graph comparing the changes in die temperature and coolant flow rate per shot during a die casting operation monitored and controlled in accordance with the prior art.

FIG. 10 is an exemplary graph similar to FIG. 5, and compares the changes in die temperature and coolant flow rate per shot during a die casting operation monitored and controlled in accordance with the prior art. In a prior art die casting operation, coolant flow is turned on at a predetermined shot. The shot can be determined according to when the die surface temperature approaches its target value. For example, as shown in the graph, coolant flow may be turned on around the fourth shot. As indicated by the graph, the coolant is immediately turned on to the target coolant flow rate. However, because the coolant is not turned on earlier, the die surface temperature will initially overshoot the target temperature because it is still being heated. Then, because the bulk heat in the die is not yet present, the die surface temperature will drop back below the target temperature. Gradually, sometimes over several hours, the die surface temperature will finally reach the target die surface temperature. It may take many casting cycles or shots until both the target die surface temperature and the target coolant flow rate are reached, which represents a state of equilibrium as discussed above. As shown in the graph, around twenty-seven shots are needed for the die to reach and remain at its target die surface temperature. The castings produced in the cycles prior to this are most often not useable and are discarded as scrap.

Referring to FIG. 5, by comparison, the die surface temperature reaches and remains at its target value in about eight shots, and reaches a state of equilibrium in about twenty-one shots. Since the coolant flow rate is proportionally controlled, the target die surface temperature is reached in a fewer number of cycles. Start-up scrap is reduced. Additionally, the method 10 reduces the set-up time for a die casting machine since die surface temperature is measured without the use of thermocouples Controlling the die surface temperature also minimizes soldering.

Figure 11:
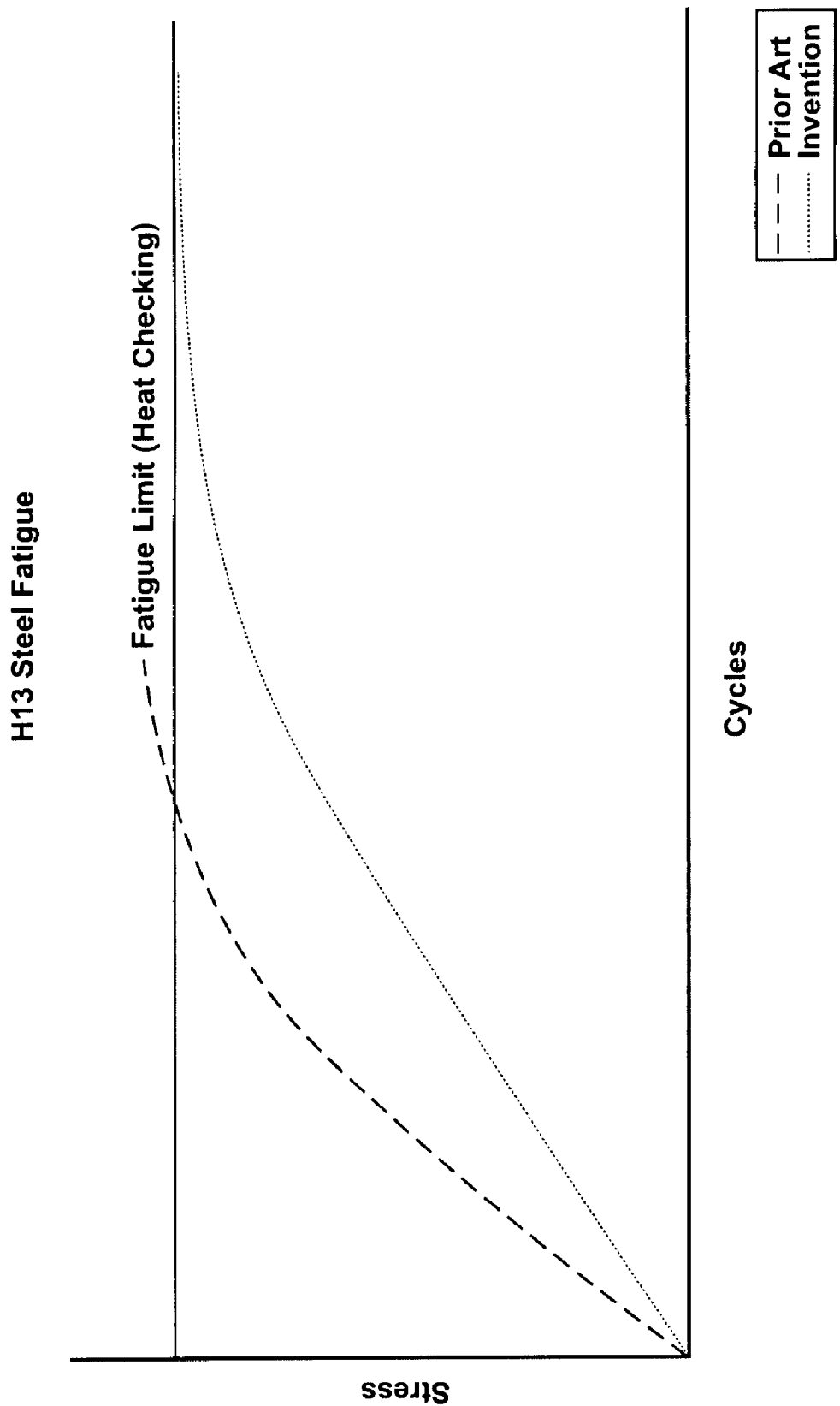
FIG. 11 is a exemplary graph comparing the steel fatigue of a prior art die to a die according to the invention.

The coolant temperature change ΔT for a die according to the invention is lower than for prior art dies because the die surface temperature is closely monitored. For example, the coolant temperate change for a typical prior art die may be around 900-1000° F., while the coolant temperature change for a die according to the invention may be around 600° F. Since the coolant temperature change is minimized, thermal fatigue of the die is reduced since it will undergo less extreme thermal cycling. Referring to FIG. 11, an exemplary graph comparing the thermal fatigue experienced by a die according to the invention to a prior art die is shown. The dies are both made of H13 steel. Due to the coolant temperature change being more extreme for the prior art die, the prior art die reaches its fatigue limit in a fewer number of cycles than the die according to the invention. Exceeding the fatigue limit of the material the mold is made from can cause a phenomenon called "heat checking" to occur. Heat checking thermally insulates the die and reduces the potential heat removal from that die.

The gas porosity of the casting can be greatly improved because less spray, which is the primary source of gas within a casting, is needed to cool the mold, due to the mold being thermally balanced through the control of the heat removal rate of each cooling line.

The ejection temperature of a casting can be more closely controlled, which offers advantages in the areas of shrinkage, dimensional accuracy, and cycle times. By ensuring that the casting is ejected as a consistently high temperature, inconsistent shrinkage of the casting is avoided. Also, by ensuring that the casting is even cooled, the casting can be ejected sooner, rather than waiting for portions of the casting to cool a sufficient amount for ejection, while other portions of the casting cool too long. Thermal control and thermal balance of the casting also reduces the amount of injection force and the number of injector pins required to take a casting out of the die.

Dimensional accuracy is primarily affected by the design of the die, but can also somewhat affected by controlling the die casting operation. The dimensional accuracy of a casting is driven by the variation of temperatures within different portions of the casting at ejection. The larger the variation of ejection temperatures within a casting, the more unlikely it is that the casting in dimensionally accurate. The method and device of the invention will verify that the correct amount of heat is being removed from the casting prior to ejection and maintain the ejection temperature of the casting within a suitable range for dimensional accuracy. Consequently, the amount of post-casting machining required on the casting can be reduced as well.

While FIG. 7 illustrates a die casting system having a chiller/pump assembly, the method of the invention can also be advantageously employed to automatically respond to contamination caused by using a plant-wide water system, such as when lime builds up inside the cooling lines. If there is contaminant buildup on the inner surface of a cooling lines, heat transfer through the cooling line is reduced. Consequently, the heat removal rate of the cooling line will be decreased. By monitoring the heat removal rates of the cooling line, a contamination problem can be automatically detected and responded to by increasing the coolant flow rate for the cooling line. For example, a cooling line might be designed to remove 100 BTUs per shot. If it is determined during use that the cooling line is only removing 90 BTUs per shot, the flow rate of coolant through the cooling line can be increased, which increases the number of BTUs removed by the cooling line to the desired design parameter of removing 100 BTUs per shot.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention, which is defined in the appended claims.

What is claimed is:

1. A method for monitoring and controlling a die casting operation in a die casting machine comprising a die having an internal die surface defining a cavity fluidly interconnected to a shot of material to be introduced into the cavity for forming a part from the material after it is introduced into the cavity and cooled for a desired period of time, the die further comprising at least one cooling line extending through the die spaced from the cavity, each of the at least one cooling line having coolant passing therethrough at a coolant flow rate, an inlet wherein the coolant is at an inlet temperature and an outlet wherein the fluid is at an outlet temperature, comprising the steps of:
   determining a heat removed by each of the at least one cooling line; and
   controlling the coolant flow rate through each of the at least one cooling line in response to the step of determining the heat removed.

2. The method of claim 1, and further comprising the step of determining a target heat removed for each of the at least one cooling line.

3. The method of claim 2 wherein the controlling step further comprises the step of comparing the heat removed with the target heat removed for each of the at least one fluid cooling line, and:
   (i) increasing the coolant flow rate for that cooling line if the heat removed by that cooling line is less than the target heat removed for that cooling line; and
   (ii) decreasing the coolant flow rate for that cooling line if the heat removed by that cooling line is greater than the target heat removed for that cooling line.

4. The method of claim 3 wherein the determining the heat removed and controlling the coolant flow rate steps are repeated at least once per shot.

5. The method of claim 1 wherein the heat removed is determined by calculating the heat removal rate of each of the at least one cooling line from the inlet temperature, outlet temperature, coolant flow rate, density of the coolant, and specific heat of the coolant.

6. The method of claim 1, and further comprising the step of determining a cooling line surface temperature for each of the at least one cooling line.

7. The method of claim 6, and further comprising the step of determining an actual die surface temperature of a portion of the cavity adjacent to each of the at least one cooling line from the cooling line surface temperature for each of the at least one cooling line and a distance of each of the at least one cooling line from the portion of the cavity.

8. A method for monitoring and controlling a die casting operation in a die casting machine comprising a die having an internal die surface defining a cavity fluidly interconnected to a shot of material to be introduced into the cavity for forming a part from the material after it is introduced into the cavity and cooled for a desired period of time, the die further comprising at least one cooling line extending through the die spaced from the cavity, each of the at least one cooling line having coolant passing therethrough at a coolant flow rate, an inlet wherein the coolant is at an inlet temperature and an outlet wherein the fluid is at an outlet temperature, comprising the steps of:
   determining a heat removed by each of the at least one cooling line; and
   controlling the coolant flow through each of the at least one cooling line in response to the step of determining the heat removed.

9. The method of claim 8, and further comprising the step of determining a target heat removed for each of the at least one cooling line.

10. The method of claim 9 wherein the controlling step further comprises the step of comparing the heat removed with the target heat removed for each of the at least one fluid cooling line, and:
   (i) increasing the coolant flow rate for that cooling line if the heat removed by that cooling line is less than the target heat removed for that cooling line; and
   (ii) decreasing the coolant flow rate for that cooling line if the heat removed by that cooling line is greater than the target heat removed for that cooling line.

11. The method of claim 10 wherein the determining the heat removed and controlling the coolant flow rate steps are repeated at least once per shot.

12. The method of claim 8 wherein the heat removed is determined by calculating the heat removal rate of each of the at least one cooling line from the inlet temperature, outlet temperature, coolant flow rate, density of the coolant, and specific heat of the coolant.

13. The method of claim 8, and further comprising the step of determining a cooling line surface temperature for each of the at least one cooling line.

14. The method of claim 13, and further comprising the step of determining an actual die surface temperature of a portion of the cavity adjacent to each of the at least one cooling line from the cooling line surface temperature for each of the at least one cooling line and a distance of each of the at least one cooling line from the portion of the cavity.

* * * * *

UNITED STATES PATENT AND TRADEMARK OFFICE
CERTIFICATE OF CORRECTION

| | | |
|---|---|---|
| PATENT NO. | : 7,886,807 B2 | Page 1 of 1 |
| APPLICATION NO. | : 11/869992 | |
| DATED | : February 15, 2011 | |
| INVENTOR(S) | : J. Scott Kirkman | |

It is certified that error appears in the above-identified patent and that said Letters Patent is hereby corrected as shown below:

Column 2, line 22, reads: "...620 that are closest to the biscuit 518."

It should read: "...520 that are closest to the biscuit 518."

Signed and Sealed this
Twenty-fourth Day of May, 2011

David J. Kappos
*Director of the United States Patent and Trademark Office*